Patented Sept. 4, 1951

2,566,383

UNITED STATES PATENT OFFICE 2,566,383

ARSENICAL COMPOUNDS AND METHODS FOR OBTAINING THE SAME

Edward W. Tillitson, Grosse Pointe, Mich., assignor to Parke, Davis & Company, Detroit, Mich., a corporation of Michigan No Drawing. Application September 17, 1947, Serial No. 774,677

9 Claims. (Cl. 260—404)

This invention relates to a new class of oil-soluble, sulfur-containing arsenical compounds and to methods for obtaining the same. More particularly, the invention relates to a class of compounds having the formula,

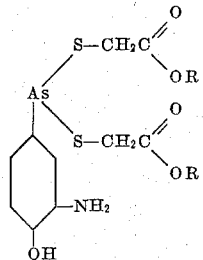

where R is an alkyl radical containing 6 to 12 carbon atoms inclusive.

While it has been recognized for many years that the injection of vegetable oil solutions of medicaments gives more constant blood levels and prolonged therapeutic effects, arsenical drugs have not been administered in this form. The reason for this lies in the inherent water and oil insolubility of the arsenical drugs. In an effort to overcome this difficulty and to make it possible to use these products therapeutically it has been the practice to solubilize these compounds by either converting them to water-soluble salts such as the alkali metal or acid addition salts or by incorporating water-solubilizing salt-forming groups into the molecule. While these practices have made it possible to take advantage of the therapeutic properties of these drugs by injection of aqueous solutions, they have also made it necessary to inject the drug frequently in order to maintain therapeutic blood levels. The new products of the invention are unique in that their oil solubility makes it possible to obtain therapeutic effects lasting over long periods of time thus obviating the necessity for frequent injections. The oil solubility of these products is particularly surprising in view of the complete oil insolubility of such closely related products as (3-amino-4-hydroxyphenyl) di-(carboxymethylmercapto)arsine, 3 - amino - 4 - hydroxyphenyl) di - (carbethoxymethylmercapto)arsine and (3 - amino - 4 - hydroxyphenyl) di-(carbamidomethylmercapto)arsine.

The compounds of the present invention may be obtained in the non-salt or free base form having the formula given above or as their acid addition salts with strong acids such as hydrochloric, hydrobromic, sulfuric, citric, tartaric and the like acids. Although the free bases are the preferred form of the products for therapeutic purposes due to their oil solubility, the acid addition salts of these compounds are valuable in that sometimes they are the most easily isolated and purified form of the products, thus the new arsenicals may be isolated and purified in the form of their acid addition salts and subsequently converted to the free bases which may be dissolved in oil and used in the treatment of trypanosomal or spirochetal infections. For therapeutic purposes the free bases of the —C$_8$H$_{17}$ or octyl esters of the invention are preferred in that they possess a high degree of therapeutic activity and oil solubility coupled with a minimal molecular weight.

In accordance with the invention the new sulfur-containing arsenic compounds are obtained by reacting a mercaptoacetic acid ester of the formula,

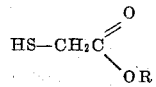

with a 3-amino-4-hydroxybenzene arsenic compound of the formula,

where R has the same significance as given above and X is —AsO, —AsO$_3$H$_2$, —As(OH)$_2$, —AsCl$_2$ or —AsBr$_2$. In general, the reaction is effected by mixing the two reactants in a solvent such as water, alcohol, lower aliphatic ketones, dioxane or mixtures of the same. When 3-amino-4-hydroxybenzenearsonic acid is used as the starting material, four equivalents instead of the customary two equivalents of the mercaptoacetic acid ester are required. Two of the equivalents of the mercapto acid ester function as a reducing agent to first reduce the arsonic acid to the arsonous acid which then reacts with the other two equivalents of the mercapto acid ester. The oxidized mercapto acid ester formed during the first phase of the reaction appears in the reaction mixture as the disulfide which in most instances is soluble in the reaction mixture.

The invention is illustrated by the following examples.

Example 1.—(3-amino-4-hydroxyphenyl) di-(carbo-n-hexyloxymethylmercapto) arsine

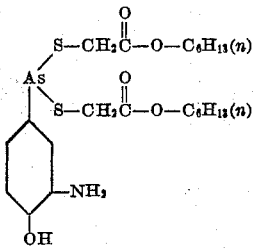

An absolute ethanol solution of 35.2 g. of n-hexyl mercaptoacetate is added to 21.7 g. of 3-amino-4-hydroxybenzenearsonous acid in absolute ethanol. The mixture is heated and stirred for a short time, concentrated to one-half volume under reduced pressure and treated with an excess of dry hydrogen chloride gas. The hydrochloride salt of (3-amino-4-hydroxyphenyl) di-(carbo-n-hexyloxymethylmercapto) arsine which separates is collected, washed with ether and dissolved in water. The solution is made alkaline with sodium hydroxide solution and the free base of the desired (3-amino-4-hydroxyphenyl) di-(carbo-n-hexyloxymethylmercapto) arsine which separates collected.

Example 2.—(3 - amino - 4 - hydroxyphenyl) di-(carbo - 2' - ethylhexyloxymethylmercapto) - arsine

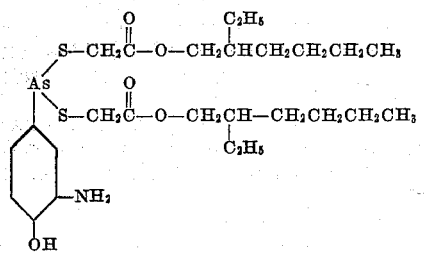

40.8 g. of 2-ethylhexyl mercaptoacetate in absolute ethanol is added to 21.7 g. of 3-amino-4-hydroxyarsonous acid in absolute ethanol. After stirring and heating for a few minutes, the solution is concentrated to about one-half volume in vacuo and treated with an excess of dry hydrogen bromide gas. The hydrobromide salt of the desired product which separates is collected, suspended in water and treated with an excess of sodium hydroxide solution. The free base of (3-amino - 4 - hydroxyphenyl) di - (carbo - 2' - ethylhexyloxymethylmercapto) arsine which is formed is collected, washed with water and dried.

Example 3.—(3 - amino - 4 - hydroxyphenyl) di-(carbo-n-octyloxymethylmercapto) arsine

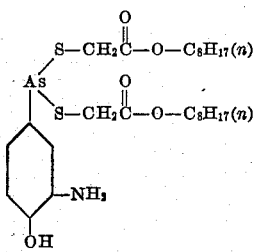

An alcohol solution containing 40.8 g. of n-octyl mercaptoacetate is added to 21.7 g. of 3-amino-4-hydroxybenzenearsonous acid in alcohol and the mixture stirred and heated for a few minutes. The alcohol is removed by distillation in vacuo and the residual (3-amino-4-hydroxyphenyl) di-(carbo - n - octyloxymethylmercapto) arsine reprecipitated from dilute acid with sodium bicarbonate in the cold.

Example 4.—(3 - amino - 4 - hydroxyphenyl) di-(carbo - 1' - methylheptyloxymethylmercapto) - arsine

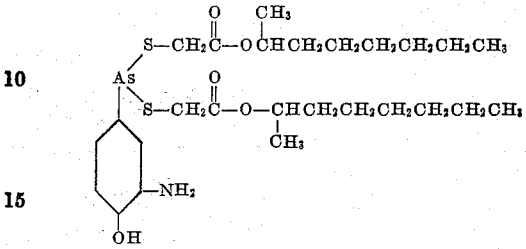

A dioxane solution containing 40.8 g. of 2-octyl mercaptoacetate is added to an alcoholic suspension of 21.7 g. of 3-amino-4-hydroxybenzenearsonous acid. After stirring and heating for a few minutes, the reaction mixture is treated with an excess of dry hydrogen chloride gas and the hydrochloride salt of the product which precipitates collected. The salt is dissolved in water, treated with an excess of sodium hydroxide solution and the free base of (3-amino-4-hydroxyphenyl) di-(carbo - 1' - methylheptyloxymethylmercapto) - arsine collected.

If desired, 3-amino- 4-hydroxybenzenearsonic acid may be substituted for the arsonous acid used above. In this case the amount of the mercaptoacetic acid ester is doubled. The product formed is identical in all respects to that obtained by the above procedure.

Example 5.—(3 - amino - 4 - hydroxyphenyl) di-(carbon-n-decyloxymethylmercapto) arsine

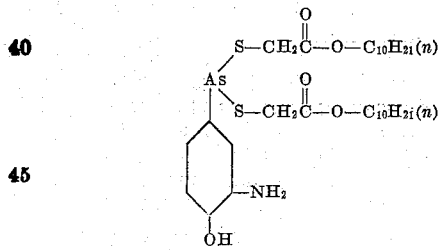

An alcohol solution of 46.4 g. of n-decyl mercaptoacetate is added to an absolute ethanol suspension of 25.4 g. of dichloro (3-amino-4-hydroxyphenyl) arsine and the mixture evaporated to about one-fourth volume and allowed to cool. The hydrochloride salt of (3-amino-4-hydroxyphenyl) di - (carbo - n - decyloxymethylmercapto) arsine which separates is collected, suspended in water and treated with an excess of sodium hydroxide solution. The free base of (3-amino - 4 - hydroxyphenyl) di - (carbo - n - decyloxymethylmercapto) arsine which forms is collected, washed with water and dried.

Example 6.—(3 - amino - 4 - hydroxyphenyl) di-(carbo-n-dodecyloxymethylmercapto) arsine

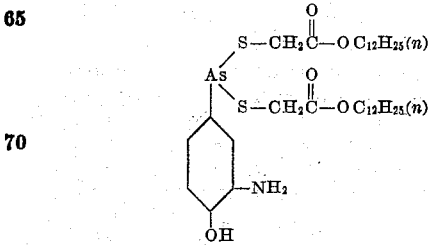

An absolute ethanol solution containing 52 g.

of n-dodecyl mercaptoacetate is added to 20 g. of 3-amino-4-hydroxybenzene arsine oxide in absolute ethanol. After stirring and heating for a few minutes, the alcohol is distilled from the reaction mixture in vacuo to obtain the free base of the desired (3-amino-4-hydroxyphenyl) di-(carbo-n-dodecyloxymethylmercapto) arsine.

What I claim as my invention is:

1. A compound of the class consisting of a free base and its acid addition salts, said free base having the formula,

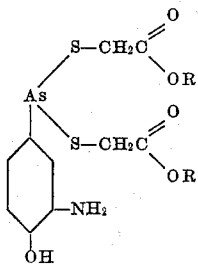

where R is an alkyl radical containing 6 to 12 carbon atoms inclusive.

2. A compound of the class consisting of a free base and its acid addition salts, said free base having the formula,

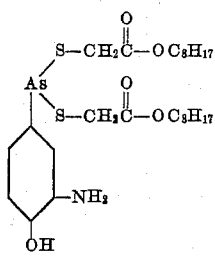

3. A compound of the formula,

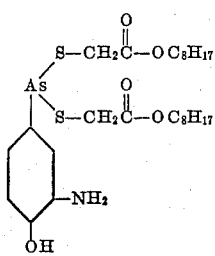

4. A compound of the class consisting of a free base and its acid addition salts, said free base having the formula,

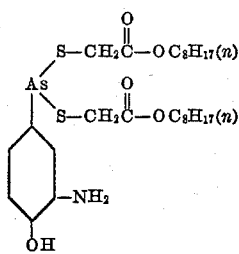

5. A compound of the formula,

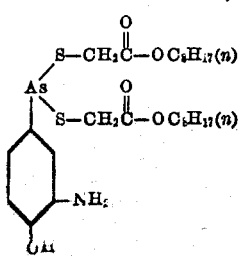

6. A compound of the class consisting of a free base and its acid addition salts, said free base having the formula,

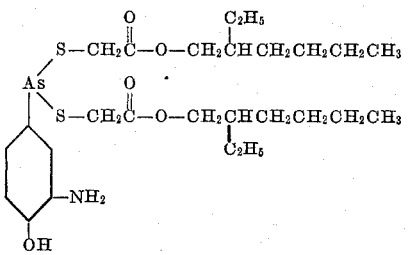

7. A compound of the formula,

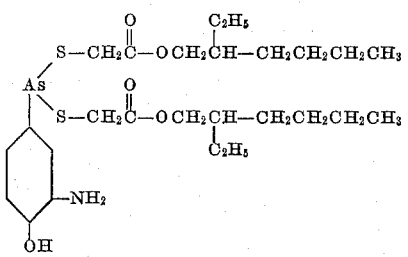

8. A compound of the class consisting of a free base and its acid addition salts, said free base having the formula,

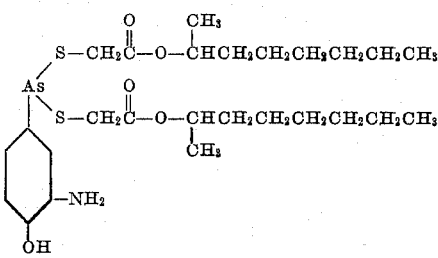

9. A compound of the formula,

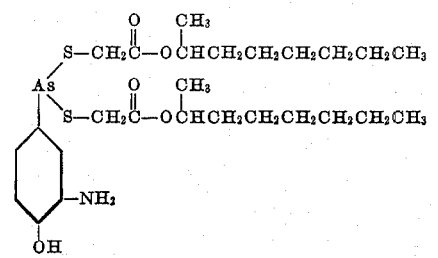

EDWARD W. TILLITSON.

REFERENCES CITED

The following references are of record in the file of this patent:

UNITED STATES PATENTS

| Number | Name | Date |
| --- | --- | --- |
| 1,909,498 | Oechslin | May 16, 1933 |
| 2,209,876 | Ewins et al. | July 30, 1940 |
| 2,331,833 | Hamilton | Oct. 12, 1943 |

FOREIGN PATENTS

| Number | Country | Date |
| --- | --- | --- |
| 331,195 | Great Britain | of 1930 |

OTHER REFERENCES

Cohen et al., J. Chem. Soc. (London) 1931, pp. 3043-3057.